United States Patent
Muraoka

(10) Patent No.: US 7,155,364 B2
(45) Date of Patent: Dec. 26, 2006

(54) MEASURING INSTRUMENT

(75) Inventor: Yoshikazu Muraoka, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/759,011

(22) Filed: Jan. 20, 2004

(65) Prior Publication Data

US 2004/0148126 A1   Jul. 29, 2004

(30) Foreign Application Priority Data

Jan. 24, 2003   (JP) ............................. 2003-016048

(51) Int. Cl.
*G01C 9/00* (2006.01)
(52) U.S. Cl. ..................... 702/150; 702/158; 702/161; 702/162
(58) Field of Classification Search ................ 702/150, 702/108, 161, 162; 33/382, 809, 706, 356, 33/359
See application file for complete search history.

(56) References Cited

U.S. PATENT DOCUMENTS

| | | | | |
|---|---|---|---|---|
| 887,994 A | * | 5/1908 | Bartram ..................... 194/283 |
| 3,658,429 A | * | 4/1972 | Zipin ......................... 356/618 |
| 3,940,982 A | * | 3/1976 | Hironaka ................. 73/170.32 |
| 4,432,141 A | * | 2/1984 | Marcyan ...................... 33/838 |
| 4,702,009 A | * | 10/1987 | Dighton et al. ............... 33/715 |
| 4,989,884 A | * | 2/1991 | Goodman ................... 277/391 |
| 5,396,712 A | | 3/1995 | Herzog ........................ 33/502 |
| 5,615,489 A | * | 4/1997 | Breyer et al. ................. 33/503 |
| 6,272,766 B1 | * | 8/2001 | Tondorf et al. ............... 33/809 |

FOREIGN PATENT DOCUMENTS

| | | |
|---|---|---|
| DE | 24 13 335 A1 | 9/1975 |
| DE | 35 14 309 A1 | 10/1986 |
| JP | A 4-45911 | 2/1992 |
| WO | WO 02/101329 A1 | 12/2002 |

* cited by examiner

*Primary Examiner*—John Barlow
*Assistant Examiner*—Stephen J. Cherry
(74) *Attorney, Agent, or Firm*—Oliff & Berridge, PLC

(57) ABSTRACT

A measuring instrument (1) has an arm (4) having a detector at a distal end thereof, and an arm guide (53) supporting the arm (4) in a manner movable in the axial direction thereof, the measuring instrument measuring a dimension of a workpiece based on the position of the detector. The arm (4) includes a main arm (41) and a sub-arm (42) that are sequentially arranged in the arm guide (53) and are supported in a manner movable relative to a former component thereof. The measuring instrument (1) has a synchronous driver (54) for moving the main arm (41) on the base side and the sub-arm (42) located next to the main arm (41) in the axial direction of the main arm (41).

4 Claims, 7 Drawing Sheets

MEASURING INSTRUMENT

BACKGROUND OF THE INVENTION

1. Field of the Invention

The present invention relates to a measuring instrument for measuring a dimension of a workpiece based on a position of a detector.

2. Description of Related Art

Conventionally, measuring instruments having an arm provided with a probe (detector) and a support for supporting the arm in a manner movable in the axial direction thereof have been known, the measuring instruments measuring a dimension of a workpiece based on the position of the probe (for instance, see Japanese Utility Model Laid-Open Publication No. Hei4-45911 [FIG. 1]).

The measuring instrument shown in the Japanese Utility Model Publication has a column movable in a direction on a horizontal surface of a base, a beam supported by the column in a manner movable in perpendicular direction of the horizontal surface, a slider supported by the beam in a manner movable in a direction orthogonal to the moving direction of the column and the beam, an arm provided on the slider and a probe provided on the tip end of the arm.

When a dimension of a workpiece is measured using the measuring instrument, the column, the beam and the slider are moved to bring the probe into contact with the workpiece.

On the other hand, a measuring instrument 7 shown in FIG. 7 has been known as one of horizontal two-dimensional measuring instruments.

The measuring instrument 7 has a base 71, a column 72 vertically mounted on a horizontal surface of the base 71, a support 73 elevatably supported by the column 72, a slider 74 supported by the support 73 in a manner movable in a direction orthogonal to the moving direction of the support 73, an arm 74 provided on the slider 74 and a probe (detector: not shown) provided on the tip end of the arm 75.

When a dimension of a workpiece is measured using the measuring instrument 7, the slider 74 is moved to bring the probe into contact with the workpiece.

However, installation space of the Japanese Utility Model Laid-Open Publication No. Hei4-45911 and the measuring instrument 7 has to be twice or more as wide as the stroke of the probe (referred to detector stroke hereinafter).

For instance, when the probe of the measuring instrument 7 is moved by a detector stroke S1, the slider 74 is also moved by the detector stroke S1, so that the length of the support 73 for supporting the slider 74 has to be at least equal to the sum of the detector stroke S1 and the length X of the slider 74.

Accordingly, the installation space W7 of the measuring instrument 7 has to be 2(S1)+X or more, i.e. twice or more as wide as the detector stroke S1.

Further, in order to meet the demand for improving efficiency and speed of measurement process, reduction of the movement time for bringing the probe into and out of contact with the workpiece has been desired.

SUMMARY OF THE INVENTION

An object of the present invention is to provide a measuring instrument capable of reducing the installation space and the measurement time thereof.

A measuring instrument according to an aspect of the present invention has: an arm provided with a detector at a distal end thereof; and a support for supporting the arm in a manner movable in the axial direction thereof, the measuring instrument measuring a dimension of a workpiece based on the position of the detector, in which the arm includes a plurality of short arms sequentially disposed on the support, the short arm being respectively supported in a manner movable relative to a former component thereof, and in which the measuring instrument has drivers for independently moving a proximal short arm and the other short arm in the axial direction of the proximal short arm.

According to the above aspect of the present invention, since the arm includes a plurality of short arms sequentially disposed on the support, the short arm being respectively supported in a manner movable relative to a former component thereof, the detector stroke becomes the sum of the strokes of the respective short arms.

Since the length of the respective short arms can be made shorter than the detector stroke, the length of the support that supports the short arms can also be made shorter than the detector stroke.

Accordingly, the installation space, i.e. the sum of the detector stroke and the length of the support can be made smaller than double of the detector stroke, so that the installation space can be reduced as compared to a conventional measuring instrument.

The travel of the detector of the above aspect of the present invention (referred to as a detector travel hereinafter) is the sum of the travels of the respective short arms and, on the other hand, the detector travel of a conventional measuring instrument is the travel of a single arm.

When the moving speed of at least one of the short arms of the above aspect of the present invention is approximately equal to the moving speed of the conventional measuring instrument, the detector travel of the present invention when the short arm is moved for a predetermined time becomes longer than that of the conventional measuring instrument.

Accordingly, the time required for moving the detector of the present invention by a predetermined distance can be shortened as compared to the conventional measuring instrument. In other words, the movement time for bringing the detector into and out of contact with a workpiece can be reduced.

Further, since the drivers for independently moving the proximal short arm and the other short arm in the axial direction of the proximal short arm are provided, the short arms can be selectively moved. For instance, when the distance to the portion to be measured is long, all of the plurality of short arms may be moved and, when the distance is short, only one short arm may be moved.

In the above aspect of the present invention, the drivers may preferably be synchronous drivers that are synchronously driven, and the proximal short arm and the other short arm may preferably be driven in an interlocking manner.

According to the above arrangement, since the drivers are the synchronous drivers that are synchronously driven and the proximal short arm and the other short arm are moved in an interlocking manner, when the moving speed of the respective short arms of the present invention is approximately equal to the moving speed of the arm of the conventional measuring instrument, the detector travel of the present invention when the respective short arms are moved for a predetermined time is approximately equal to that of the conventional measuring instrument multiplied by the number of the short arms.

Accordingly, the movement time for bringing the detector into and out of contact with the workpiece can be the time dividing the movement time of the conventional measuring instrument divided by the number of the short arms.

In the above aspect of the present invention, the short arm may preferably include a first short arm supported by the support and a second short arm provided next to the first short arm and having the detector at a distal end thereof, and the synchronous driver may preferably have a first moving mechanism for moving the first short arm in the axial direction and a second moving mechanism for moving the second short arm in the same direction as the moving direction of the first short arm in synchronization with the first moving mechanism.

According to the above arrangement, since the arm includes the first short arm supported by the support and the second short arm provided next to the first short arm, by arranging the lengths of the first and the second short arms and the support to be approximately equal, the lengths of the respective components can be made approximately half of the detector stroke. Accordingly, the installation space can be made approximately two thirds of the detector stroke, i.e. three fourths of that of the conventional measuring instrument.

Further, the movement time for bringing the detector into and out of contact with the workpiece can be made approximately half of that of the conventional measuring instrument.

Further, since the first moving mechanism and the second moving mechanism are independently provided, the first short arm and the second short arm can be moved at different speeds in accordance with the lengths thereof.

In the above aspect of the present invention, the first moving mechanism may preferably have a rack provided on the support along the moving direction of the first short arm, a pinion rotatably provided on the first short arm and meshing with the rack, and a rotation-applying device for rotating a shaft of the pinion, and the second moving mechanism may preferably have a first pulley fixed to the shaft of the pinion, a second pulley rotatably supported on the distal end of the first short arm, and a belt wound around the pulleys with a part thereof being jointed with the second short arm.

According to the above arrangement, since the first moving mechanism and the second moving mechanism respectively include the inexpensive and simply-structured rack and pinion mechanism and belt-pulley mechanism, the synchronous driver can be inexpensively provided and repair work thereof can be facilitated.

Further, since the pulley is provided on the shaft of the pinion and the shaft is rotated by the rotation-applying device, the two short arms can be moved by a single drive source.

In the above aspect of the present invention, the support and the first short arm may preferably be tubular cylinders, the first short arm may preferably be accommodated in the support and the second short arm may preferably be accommodated in the first short arm.

According to the above arrangement, since the first short arm and the second short arm respectively provided next to the tubular cylindrical support and the first short arm are accommodated inside the support and the first short arm, a plurality of support members for movably supporting the latter component may be provided along the inner circumference of the support and the first short arm.

Accordingly, the shift of the first and the second short arms in a direction orthogonal to the moving direction thereof can be restrained and the position shift of the detector can also be restrained, thereby reducing the measurement error.

Further, in the above arrangement, the second short arm is thinner than the first short arm and the first short arm is thinner than the support.

Accordingly, when the arm is stretched, the flexure of the first and the second short arms on account of the self-weight thereof can be restrained and the position shift of the detector can also be restrained, thereby reducing the measurement error.

In the above aspect of the present invention, air bearings may preferably be provided between the support and the first short arm and between the first short arm and the second short arm.

According to the above arrangement, since the air bearings are provided between the support and the first short arm and between the first short arm and the second short arm, the movement of the first short arm relative to the support and the movement of the second short arm relative to the first short arm can be smoothly conducted.

In the above arrangement, a cover that covers the second short arm from the distal end of the first short arm to the distal end of the second short arm may preferably be provided, the cover being stretchable in the moving direction of the second short arm in accordance with the movement of the second short arm.

According to the above arrangement, since the cover that covers the second short arm from the distal end of the first short arm to the distal end of the second short arm and stretches and contracts in the moving direction of the second short arm in accordance with the movement of the second short arm is provided, the section between the first short arm and the second short arm can be kept clean and the movement of the first and the second short arms can be made smooth.

DETAILED DESCRIPTION OF THE PREFERRED EMBODIMENT(S)

An embodiment of the present invention will be described below with reference to attached drawings.

Figure 1:
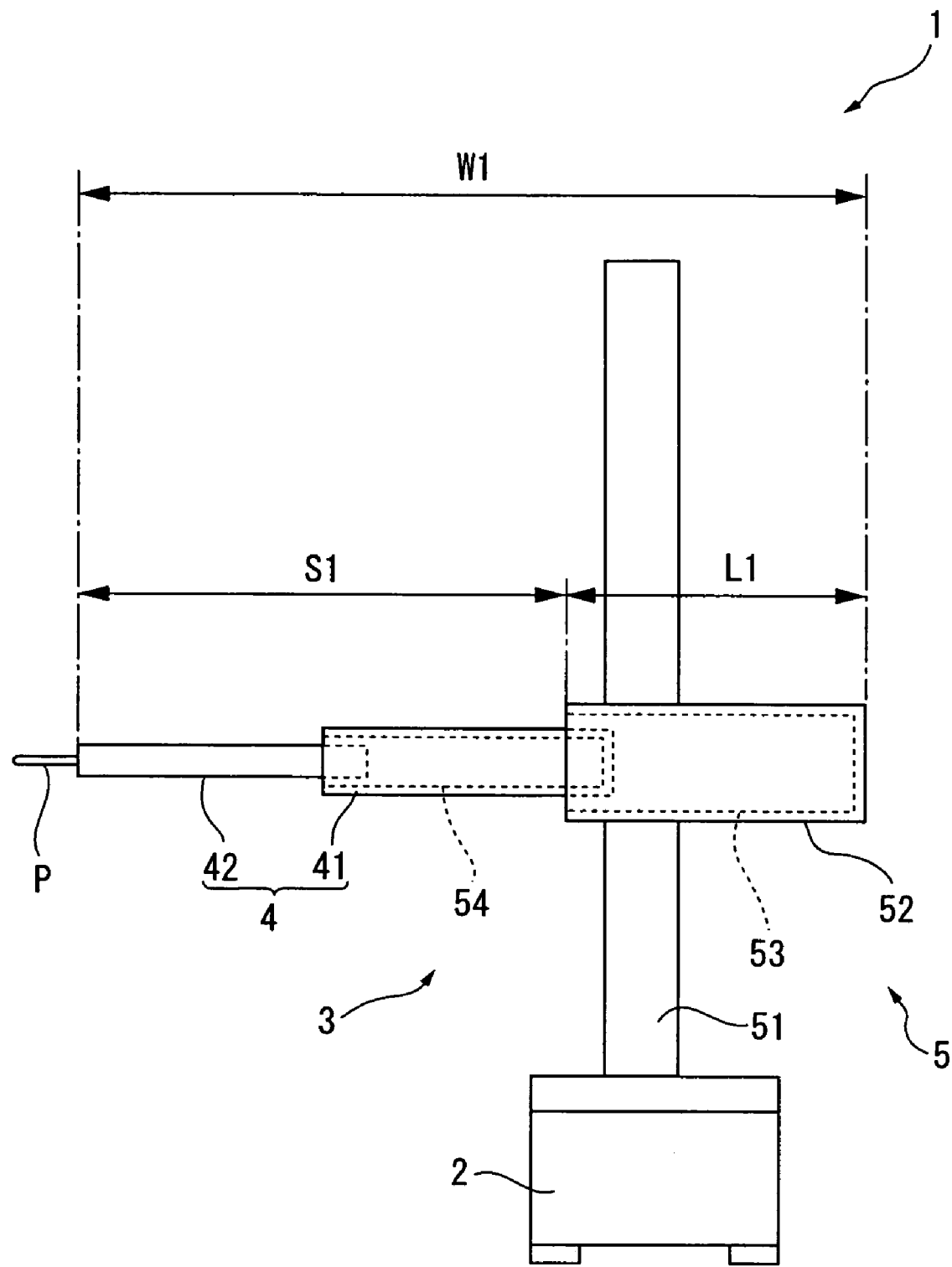
FIG. 1 is a front elevational view of a measuring instrument according to an embodiment of the present invention.

FIG. 1 is a front elevational view of a horizontal two-dimensional measuring instrument 1 of the present embodiment (referred to as measuring instrument 1 hereinafter).

As shown in FIG. 1, the measuring instrument 1 has a base 2 and a measuring component 3.

The measuring component 3 has an arm 4 provided with a probe P (detector) at a tip end thereof, and a relative moving mechanism 5 for moving the arm 4 relative to a workpiece.

The arm 4 includes a main arm 41 (first short arm) supported by an arm guide 53 (support) provided on the relative moving mechanism 5, and a sub-arm 42 (second short arm) provided next to the main arm 41 and having a probe P at a tip end thereof.

Figure 2A:
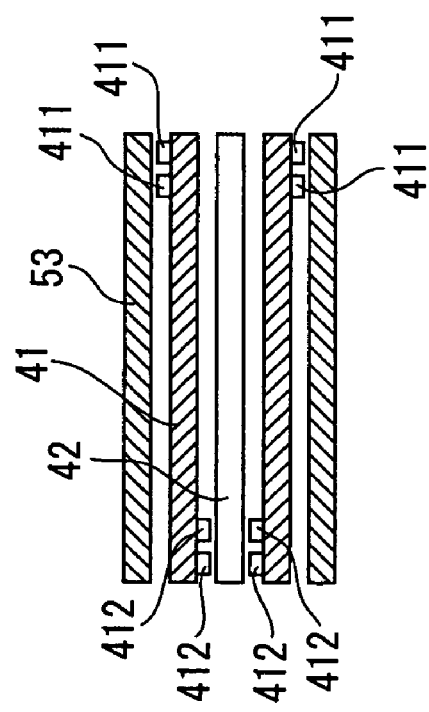
FIG. 2 is a schematic illustration showing the movement of a primary portion of the aforesaid embodiment.

The arm guide 53 and the main arm 41 are tubular cylinders and the sub-arm 42 is a solid cylinder, where the main arm 41 is accommodated inside the arm guide 53 and the sub-arm 42 is accommodated within the main arm 41 as shown in FIG. 2(A) and (B).

The lengths of the arm guide 53, the main arm 41 and the sub-arm 42 are substantially equal in the axial direction thereof.

A plurality of air bearings 411 are provided along the outer circumference of the main arm 41 on the side of the proximal side (right side in FIG. 2(A)).

Another plurality of air bearings 412 are provided along the inner circumference of the distal side of the main arm 41.

The relative moving mechanism 5 has a column 41 vertically mounted on the horizontal surface of the base 2, a carriage 52 movably supported on the column 51, the arm guide 53 fitted to the carriage 52, and a synchronous driver 54 for moving the main arm 41 and the sub-arm 42 simultaneously in the same direction.

The length of the carriage 52 in the axial direction is L1, which is longer than the length of the arm guide 53.

Figure 3:
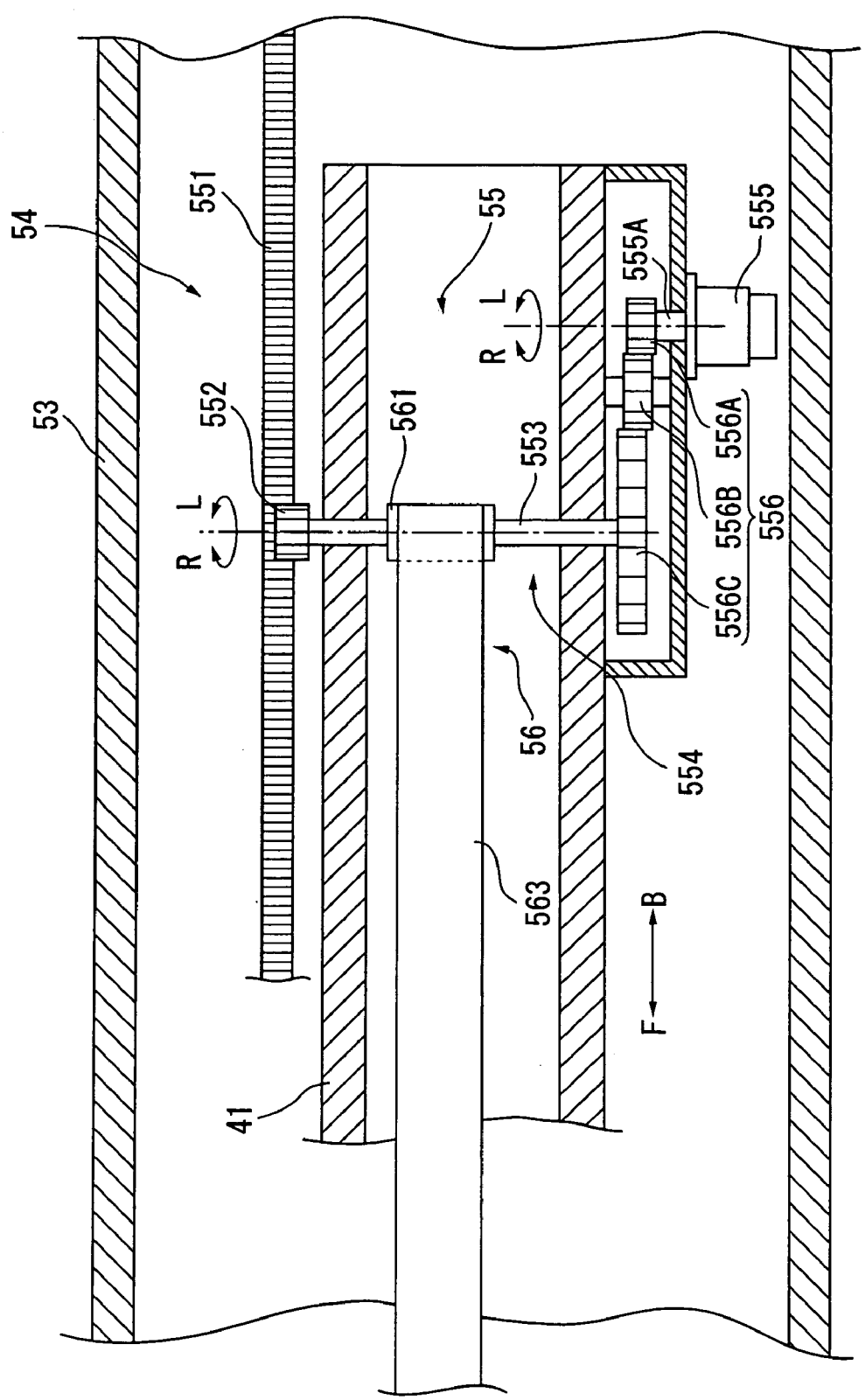
FIG. 3 is a schematic cross section of the primary portion of the aforesaid embodiment.
Figure 4:
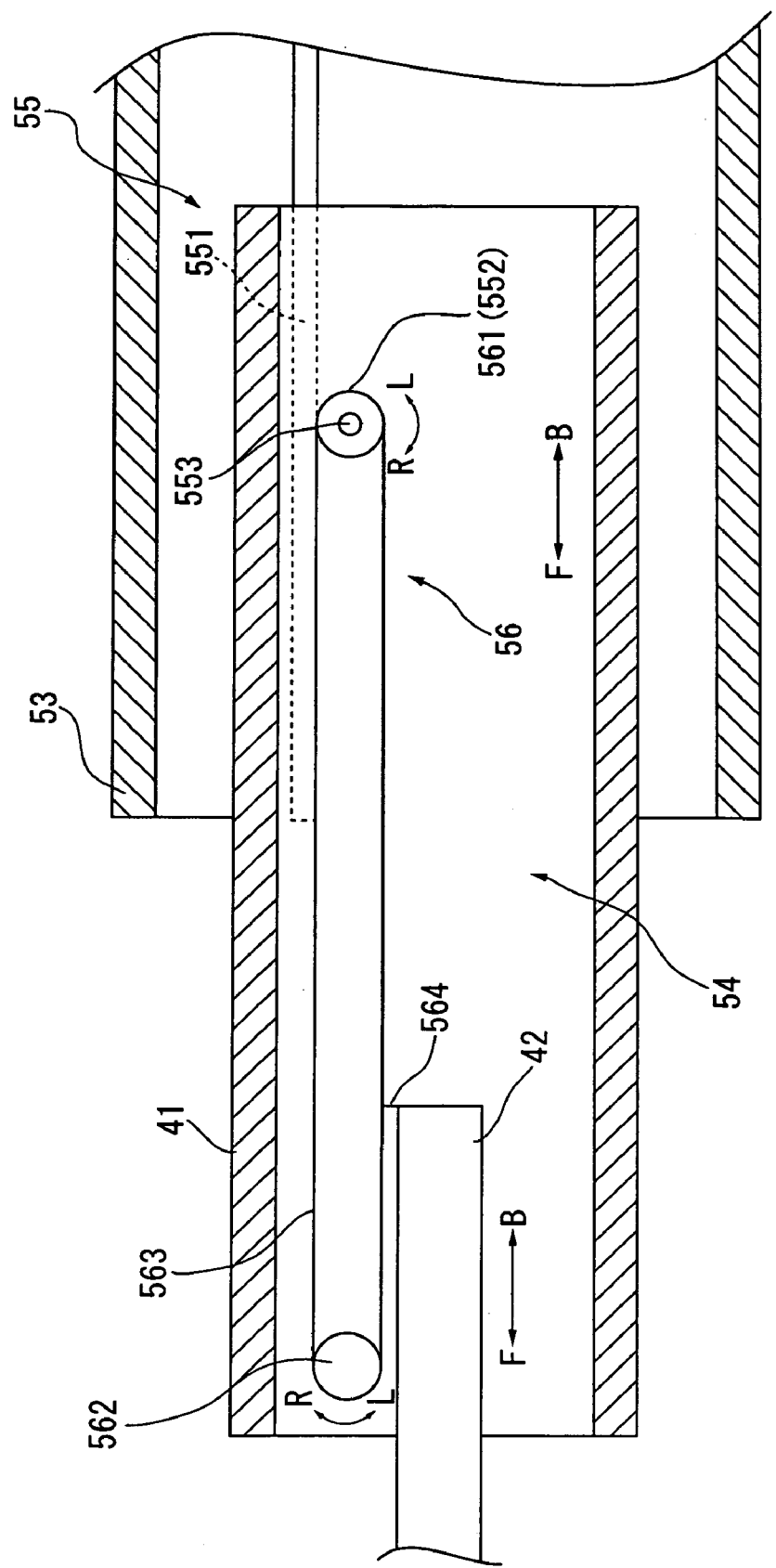
FIG. 4 is another schematic cross section of the primary portion of the aforesaid embodiment.

As shown in FIGS. 3 and 4, the synchronous driver 54 has a main arm moving mechanism 55 (first moving mechanism) for moving the main arm 41 in the axial direction, and a sub-arm moving mechanism 56 (second moving mechanism) for moving the sub-arm 42 in the same direction as the moving direction of the main arm 41 in synchronization with the main arm moving mechanism 55.

The main arm moving mechanism 55 has a rack 551 provided on the arm guide 53 along the moving direction of the main arm 41, a pinion 552 rotatably mounted on the main arm 41 to be meshed with the rack 551 and a rotation-applying device 554 for rotating a rotary shaft 553 of the pinion 552.

The distal end (upper side in FIG. 3) of the rotary shaft 553 projects from the main arm 41 and the pinion 552 is attached to the projected tip end.

The rotation-applying device 554 has a motor 555 and a gear train 556 for transmitting the rotation of the motor 555 to the rotary shaft 553.

The gear train 556 includes a driving gear 556A attached to a rotary shaft 555A of the motor 555, a transmission gear 556B meshing with the driving gear 556A, and a driven gear 556C attached to the proximal end of the rotary shaft 553 and meshing with the transmission gear 556B.

The sub-arm moving mechanism 56 has a drive-side pulley 561 fixed approximately at the center of the rotary shaft 553, a driven-side pulley 562 rotatably held near the distal end of the main arm 41, a timing belt 563 wound around the drive-side pulley 561 and the driven-side pulley 562, and a joint 564 provided between the timing belt 563 and the proximal end of the sub-arm 42.

The diameters of the pinion 552, the drive-side pulley 561 and the driven-side pulley 562 are arranged equal so that the movement amount of the main arm 41 relative to the arm guide 53 (referred to as main arm travel hereinafter) becomes equal to the movement amount of the sub-arm relative to the main arm 41 (referred to as sub-arm travel hereinafter) when the main arm 41 and the sub-arm 42 are moved for a predetermined time by driving the synchronous driver 54.

The length of the rack 551 and the distance between the drive-side pulley 561 and the driven-side pulley 562 are adjusted so that the stroke of the main arm 41 relative to the arm guide 53 (referred to as main arm stroke hereinafter) becomes equal to the stroke of the sub-arm 42 relative to the main arm 41 (referred to as sub-arm stroke hereinafter) and the sum of the strokes, i.e. the detector stroke becomes S1.

How a dimension of a workpiece is measured using the measuring instrument 1 will be described below.

The carriage 52 is moved along the column 51 in accordance with the height of the measuring point of the workpiece.

At this time, as shown in FIG. 2(A), the main arm 41 and the sub-arm 42 are respectively accommodated in the arm guide 53 and the main arm 41 provided as a former component thereof (referred to as initial condition hereinafter).

When the synchronous driver 54 is driven, the main arm 41 and the sub-arm 42 are simultaneously moved toward the measuring point.

Specifically, when the motor 555 is driven and the driving gear 556A is rotated in R direction shown in FIG. 3, the driven gear 556C is also rotated in the R direction.

When the driven gear 556C is rotated in the R direction, the pinion 552 and the drive-side pulley 561 provided on the rotary shaft 553 are also rotated in the R direction.

When the pinion 552 is rotated in the R direction, the main arm 41 is moved in F direction by the rack and pinion mechanism and the main arm travel at the time is detected by a main arm position sensor (not shown).

When the drive-side pulley 561 is rotated in the R direction, the sub-arm 42 is moved in the F direction by the belt-pulley mechanism and the sub-arm travel at the time is detected by a sub-arm position sensor (not shown).

The detector travel is equal to the sum of the main arm travel and the sub-arm travel, which is calculated by a probe position sensor (not shown).

Figure 2B:
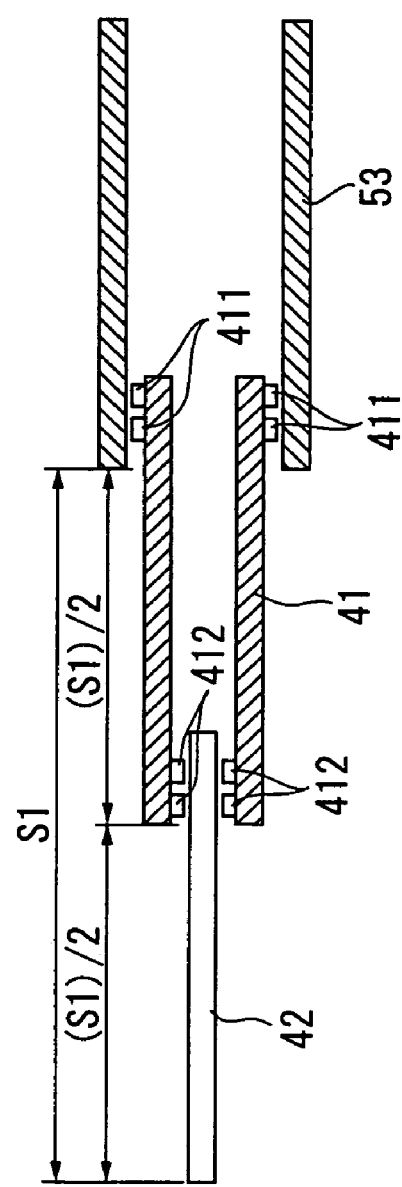

For instance, when the main arm travel and the sub-arm travel become respectively (S1)/2 at T second after the initial condition as shown in FIG. 2(B), the detector travel is equal to the detector stroke S1.

The dimension of the workpiece can be obtained based on the thus-obtained detector travel when the probe P is in contact with the measuring point.

When the arm 4 is restored to the initial condition, the driving gear 556A is rotated in L direction by the motor 555, so that the respective components are rotated and moved in a direction reverse to the above-described direction to return to the initial condition.

According to the above-described embodiment, following advantages can be obtained.

Since the arm 4 is composed of a plurality of short arms and the synchronous driver 54 for simultaneously moving the short arms in the same direction is provided, the detector stroke S1 can be arranged as the sum of the strokes of the respective short arms and the lengths of the respective short arms can be made shorter than the detector stroke S1.

Accordingly, the length of the carriage 52 in which the arm guide 53 for supporting the short arms is fitted can be made shorter than the detector stroke S1, so that a installation space W1 of the measuring instrument 1 can be made smaller than the installation space W7 of the measuring instrument 7, thereby achieving space reduction.

Especially, since the arm 4 of the measuring instrument 1 of the present embodiment includes the main arm 41 and the sub-arm 42 having approximately the same length and the length of the carriage 52 is L1 (L1 ≒(1/2)*S1), the installation space W1 (=S1+L1 ≒(3/2)*S1) of the measuring instrument 1 is approximately equal to three fourths of the installation space W7 (=2*(S1)+X) of the measuring instrument 7.

When the moving speed of the respective short arms of the measuring instrument 1 is equal to the moving speed of the arm 75 of the measuring instrument 7, since the travel of the respective short arms of the measuring instrument 1 is the same as the travel of the arm 75, the detector travel of the measuring instrument 1 is approximately equal to the travel of the arm of the measuring instrument 7 multiplied by the number of the short arms.

Accordingly, the time for moving the probe P of the measuring instrument 1 for a predetermined distance can be reduced as compared to the measuring instrument 7, so that the time for bringing the probe P into and out of contact to the workpiece can be reduced.

Especially, since the arm 4 of the measuring instrument 1 of the present embodiment includes the main arm 41 and the sub-arm 42, the movement time for bringing the probe P into and out of contact with the workpiece can be made approximately half of the movement time of the measuring instrument 7.

Further, since the main arm moving mechanism 55 and the sub-arm moving mechanism 56 are independently provided, the main arm 41 and the sub-arm 42 can be moved at different speeds in accordance with the lengths thereof.

Since the main arm moving mechanism 55 and the sub-arm moving mechanism 56 respectively include the inexpensive and simply-structured rack and pinion mechanism and belt-pulley mechanism, the synchronous driver 54 can be inexpensively provided and repair work thereof can be facilitated.

Since the drive-side pulley 561 is provided on the rotary shaft 553 of the pinion 552 and the rotary shaft 553 is rotated by the motor 555 of the rotation-applying device 554, the two short arms can be driven with a single drive source.

Since the approximately cylindrical arm guide 53 and the main arm 41 accommodates the latter components, i.e. the main arm 41 and the sub-arm 42, there inside, the plurality of air bearings 411 for movably supporting the main arm 41 relative to the arm guide 53 can be provided along the outer circumference of the proximal end of the main arm 41 and the plurality of air bearings 412 for movably supporting the sub-arm 42 relative to the main arm 41 can be provided along the inner circumference of the distal side of the main arm 41.

Accordingly, the shift of the main arm 41 and the sub-arm 42 in a direction orthogonal to the moving direction thereof can be restrained, so that measurement error can be restrained.

Since the sub-arm 42 is thinner than the main arm 41 and the main arm 41 is thinner than the arm guide 53, the flexure of the main arm 41 and the sub-arm 42 caused when the arm 4 is stretched can be restrained, so that the measurement error can be restrained.

Further, the air bearings 411 and 412 allows smooth movement of the main arm 41 relative to the arm guide 53 and the movement of the sub-arm 42 relative to the main arm 41.

Incidentally, the scope of the present invention is not restricted to the above embodiments, but includes modifications and improvements as long as an object of the present invention can be achieved.

For instance, though the arm 4 of the above embodiment includes two short arms, the arm 4 may include more than two arms.

Though the diameters of the pinion 552, the drive-side pulley 561 and the driven-side pulley 562 are arranged equal so that the main arm travel is equal to the sub-arm travel when the main arm 41 and the sub-arm 42 are moved for a predetermined time by driving the synchronous driver 54, the pinion 552, the drive-side pulley 561 and the driven-side pulley 562 may have different diameters so that the main arm travel becomes not equal to the sub-arm travel.

Though the length of the rack 551 and the distance between the drive-side pulley 561 and the driven-side pulley 562 are adjusted so that the main arm stroke becomes equal to the sub-arm stroke, the length and the distance may be adjusted so that the main arm stroke becomes different from the sub-arm stroke.

However, since the length L1 of the carriage 52 can be minimized for the same the detector stroke, the installation space W1 can be minimized S1 in the above embodiment.

Though the rack and pinion mechanism is provided on the main arm moving mechanism 55 and the belt pulley mechanism is provided on the sub-arm moving mechanism 56 in the above embodiment, other relative moving mechanism may be provided as long as the main arm 41 can be moved relative to the arm guide 53 and the sub-arm 42 can be moved relative to the main arm 41.

Though the main arm 41 and the sub-arm 42 are moved with a single synchronous driver 54 in the above embodiment, the same advantage can be obtained by simultaneously driving independent drivers respectively for driving the main arm 41 and the sub-arm 42. In the above arrangement, by selectively moving only, for instance, the main arm 41, since the main arm 41 is more rigid than the sub-arm 42, the deformation of the arm 4 can be restrained as compared to an arrangement where only the sub-arm 42 is moved. Further, since only a single arm is moved, the deformation of the arm 4 can be reduced as compared to the arrangement where both of the main arm 41 and the sub-arm 42 are moved. Accordingly the straightness of the movement of the arm 4 can be secured and the measurement accuracy can be improved. On the other hand, when only the sub-arm 42 is moved, narrow section can be measured.

Figure 5:
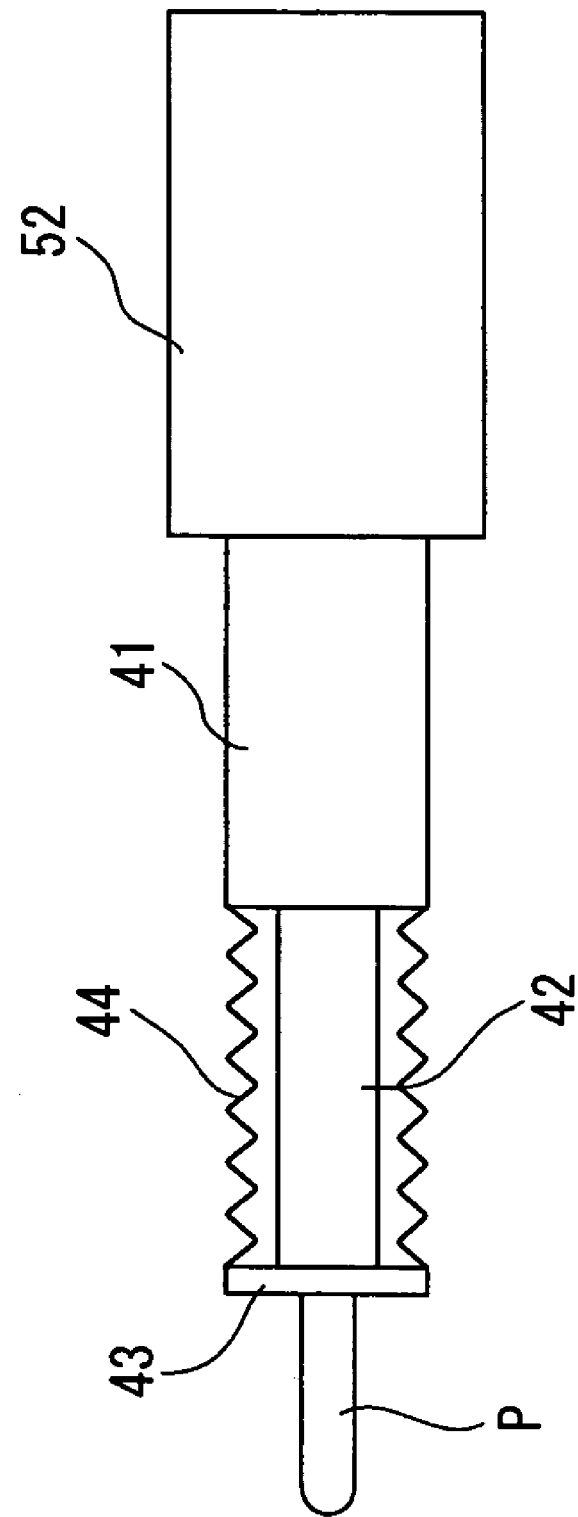
FIG. 5 is a front elevational view showing a modification of the aforesaid embodiment.

As shown in FIG. 5, a probe mount 43 on which a probe P is provided may be attached to the tip end of the sub-arm 42, and a stretchable cover 44 may be attached between the proximal end of the probe mount 43 and the tip end of the main arm 41. According to the above arrangement, the section between the main arm 41 and the sub-arm 42 can be kept clean and the arms can be smoothly moved.

The stretchable cover may be attached to the outside of the main arm 41, or, alternatively, a single stretchable cover may be attached spanning over the main arm 41 and the sub-arm 42.

Figure 6:
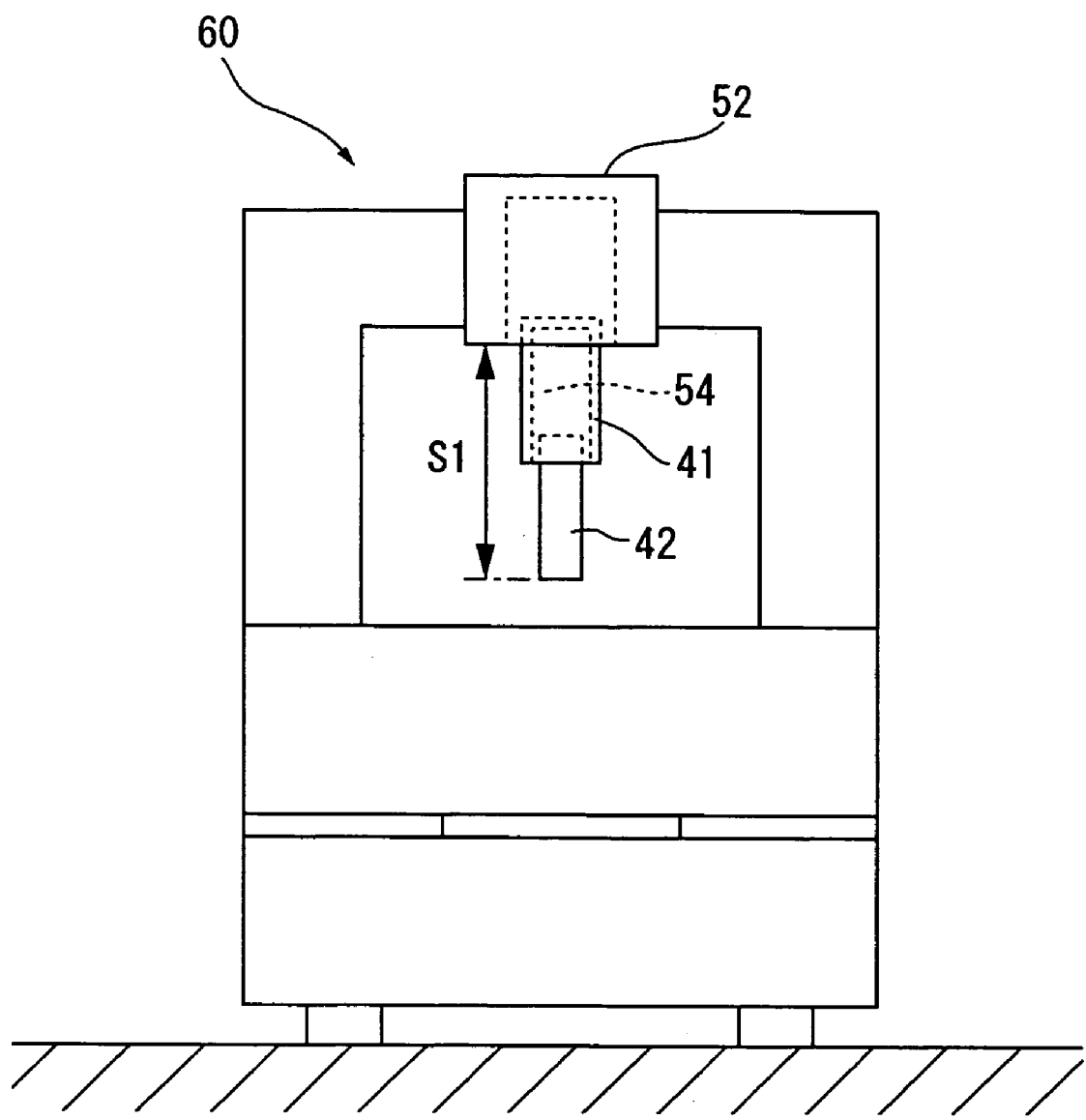
FIG. 6 is another front elevational view showing another modification of the aforesaid embodiment.
Figure 7:
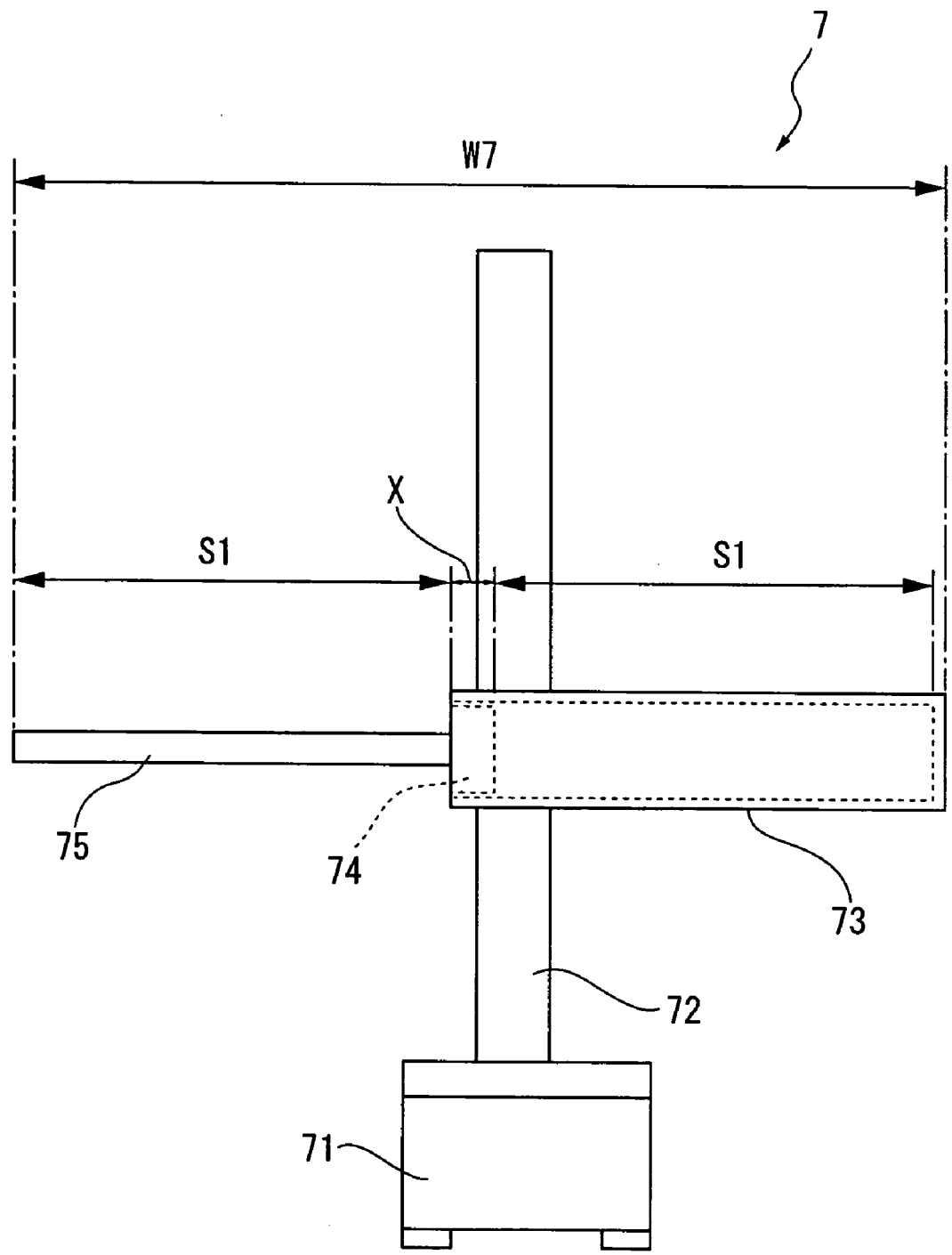
FIG. 7 is a front elevational view showing a conventional measuring instrument.

Though the main arm 41, the sub-arm 42 and the synchronous driver 54 are provided on a horizontal two-dimensional measuring instrument 1, the components may be installed on a one-dimensional or three-dimensional measuring instrument of horizontal or vertical type. For instance, as shown in FIG. 6, when the above components are installed on a vertical three-dimensional measuring instrument 60, the space in vertical direction can be reduced.

Though the probe P is used as the detector, a non-contact detector using a CCD camera or laser beam may be used. In other words, the present invention can be applied to any measuring instrument as long as the dimension of the workpiece is measured based on a position of a detector.

What is claimed is:

1. A measuring instrument, comprising:

an arm provided with a detector at a distal end thereof, the arm including a plurality of short arms comprising a first short arm and a second short arm;

a support for supporting the arm in a manner movable in an axial direction thereof; and drivers being capable of synchronously moving the first short arm and the second short arm in the axial direction of the first short arm, the measuring instrument capable of measuring a dimension of a workpiece based on a position of the detector, the short arms being sequentially disposed on the support in a manner in which the first short arm is accommodated in the support and the second short arm is accommodated in the first short arm, and the short arms being respectively supported in a manner movable relative to one another, wherein the drivers are synchronous drivers that are synchronously driven, and the first short arm and the second short arm are driven in an interlocking manner, the first short arm being supported by the support and the second short arm being provided next to the first short arm and having the detector at a distal end thereof, wherein the synchronous drivers have a first moving mechanism for moving the first short arm in the axial direction and a second moving mechanism for moving the second short arm in the same direction as the moving direction of the first short arm in synchronization with the first moving mechanism, wherein the first moving mechanism has a rack provided on the support along the moving direction of the first short arm, a pinion rotatably provided on the first short arm and meshing with the rack, and a rotation-applying device for rotating a shaft of the pinion, and wherein the second moving mechanism has a first pulley fixed to the shaft of the pinion, a second pulley rotatably supported on the distal end of the first short arm, and a belt wound around the pulleys with a part thereof being jointed with the second short arm.

2. The measuring instrument according to claim 1, wherein the support and the first short arm are tubular cylinders, and wherein the first short arm is accommodated in the support and the second short arm is accommodated in the first short arm.

3. The measuring instrument according to claim 2, further comprising air bearings provided between the support and the first short arm and between the first short arm and the second short arm.

4. The measuring instrument according to claim 1, further comprising a cover that covers the second short arm from the distal end of the first short arm to the distal end of the second short arm, the cover being stretched and contracted in the moving direction of the second short arm in accordance with the movement of the second short arm.

* * * * *